(12) United States Patent
Moscoso

(10) Patent No.: US 9,211,530 B2
(45) Date of Patent: Dec. 15, 2015

(54) LOW SILICON SAPO-42 AND METHOD OF MAKING

(71) Applicant: UOP LLC, Des Plaines, IL (US)

(72) Inventor: Jaime G. Moscoso, Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 594 days.

(21) Appl. No.: 13/715,531

(22) Filed: Dec. 14, 2012

(65) Prior Publication Data

US 2014/0170062 A1 Jun. 19, 2014

(51) Int. Cl.
| | |
|---|---|
| *C01B 39/54* | (2006.01) |
| *B01J 29/85* | (2006.01) |
| *C01B 37/08* | (2006.01) |
| *B01J 35/00* | (2006.01) |

(52) U.S. Cl.
CPC ............... *B01J 29/85* (2013.01); *C01B 37/08* (2013.01); *C01B 39/54* (2013.01); *B01J 35/002* (2013.01)

(58) Field of Classification Search
CPC .......... C01B 39/54; C01B 37/08; B01J 29/85; B01J 35/002
See application file for complete search history.

(56) References Cited

U.S. PATENT DOCUMENTS

| | | | |
|---|---|---|---|
| 4,938,937 A * | 7/1990 | Lesch et al. ............. | C01B 37/04 423/305 |
| 5,663,471 A | 9/1997 | Kvisle et al. | |
| 6,207,872 B1 | 3/2001 | Barger et al. | |
| 6,773,694 B1 | 8/2004 | Lesch et al. | |
| 6,838,586 B2 | 1/2005 | Mertens et al. | |
| 7,071,136 B2 | 7/2006 | Chang et al. | |
| 7,329,625 B2 | 2/2008 | Chang | |
| 7,547,812 B2 | 6/2009 | Sinkler et al. | |
| 7,578,987 B2 | 8/2009 | Wilson | |
| 7,772,337 B2 | 8/2010 | Chang et al. | |
| 7,922,997 B2 | 4/2011 | Moscoso et al. | |
| 7,947,621 B2 | 5/2011 | Chang et al. | |
| 7,972,989 B2 | 7/2011 | Sinkler et al. | |
| 7,973,208 B2 | 7/2011 | Sinkler et al. | |
| 7,977,273 B2 | 7/2011 | Sinkler et al. | |
| 2003/0129128 A1 | 7/2003 | Strohmaier et al. | |
| 2005/0054516 A1 | 3/2005 | Vaughn et al. | |
| 2011/0124937 A1 | 5/2011 | Mertens et al. | |

FOREIGN PATENT DOCUMENTS

| | | |
|---|---|---|
| EP | 2 098 287 A1 | 9/2009 |
| RU | 2091305 C1 | 9/1997 |
| RU | 2284294 C2 | 9/2006 |
| RU | 2365410 C1 | 8/2009 |
| WO | WO 2005/056184 | 6/2005 |

OTHER PUBLICATIONS

Schmidt et al, The synthesis of aluminophosphate and germanosilicate LTA suing a triquarternary structure directing agent, Microporous and Mesoporous Materials, 200 (2014), 132-139.*
Martinez-Franco et al, "Self-Assembled Aromatic Molecules as Efficient Organic Structure Directing Agents to Synthesize the Silicoaluminophosphate SAPO-42 with Isolated Si Species", Chemistry of Materials (2015), 27, 2981-2989.*
Weyda et al., "Kinetic Studies of the Crystallination of Aluminophosphate . . . "Studies in Surface Science and Catalysis, vol. 49, Issue C, 1989, pp. 169-178.
Schreyeck et al., "The diaza-polyoxa-macrocycle 'Kryptofix222' as a new . . . ," Microporous and Mesoporous Materials 22, (1998) pp. 87-106.
Fayad et al., "A Rational Approach to the Ionothermal Synthesis of an . . . ," Angew. Chem. Int. Ed. 2010, 49, pp. 4585-4588.
Search Report dated Dec. 19, 2013 for corresponding PCT Appl. No. PCT/US2013/061829.

* cited by examiner

*Primary Examiner* — David M Brunsman

(57) ABSTRACT

A porous crystalline silico-alumino-phosphate molecular sieve is described. The molecular sieve has a framework composition on an anhydrous and calcined basis expressed by an empirical formula $$(Si_xAl_yP_z)O_2$$

where x is the mole fraction of Si and has a value from 0.001 to about 0.5, y is the mole fraction of Al and has a value of at least 0.01, z is the mole fraction of P has a value of at least 0.01, and x+y+z=1, where the molecular sieve is characterized as having a LTA framework with an average crystal size of less than 5 micrometers. Methods of making the molecular sieves are also described.

20 Claims, No Drawings

LOW SILICON SAPO-42 AND METHOD OF MAKING

FIELD OF THE INVENTION

This invention relates generally to molecular sieves, and more particularly to a novel molecular sieve and a catalyst incorporating it, and a process for producing the molecular sieve.

BACKGROUND OF THE INVENTION

SAPOs are molecular sieves which have a three-dimensional microporous framework structure of $AlO_4$, $PO_4$ and $SiO_4$ tetrahedral units.

Microporous silicoaluminophosphate (SAPO) molecular sieves are built of alumina, phosphate and silicate tetrahedral building units. They are manufactured from sources of silicon, such as a silica sol, aluminum, such as hydrated aluminum oxide, and phosphorus, such as orthophosphoric acid. The use of organic templates, such as tetraethylammonium hydroxide, isopropylamine or di-n-propylamine, plays a major role in synthesizing new molecular sieves.

Conventional SAPO-42 is a silica-alumina-phosphate molecular sieve with 3-D intersecting channels and 8 member ring pore openings. The silicon content of SAPO-42 is in the range of about 10-15 wt %. SAPO-42 has cubic morphology with a crystalline size of approximately 1-100 μm. The following organic amines have been identified as a suitable organic template for the synthesis of SAPO-42: diethanolamine with tetramethylammonium hydroxide or fluoride or fluoride and dipropylammonium (DPA), fluoride with crown ethers Kryptofix 22 and Kryptofix 222 (K222). Crystallization of SAPO-42 is performed from 125 to 200° C., and it has a crystallization period, typically of from hours to days.

However, these processes involve several long mixing steps, are difficult to reproduce consistently, and/or use expensive templates such as crown ethers.

Improved SAPO-42 molecular sieves and methods of making them are needed.

SUMMARY OF THE INVENTION

One aspect of the invention is a porous crystalline silico-alumino-phosphate molecular sieve. In one embodiment, the molecular sieve has a framework composition on an anhydrous and calcined basis expressed by an empirical formula $$(Si_xAl_yP_z)O_2$$

where x is the mole fraction of Si and has a value from 0.001 to about 0.15, y is the mole fraction of Al and has a value of at least 0.01, z is the mole fraction of P has a value of at least 0.01, and x+y+z=1, where the molecular sieve is characterized as having a LTA framework with an average crystal size of less than 5 μm.

Another aspect of the invention is a process for the preparation of a porous crystalline silico-alumino-phosphate molecular sieve having a framework composition on an anhydrous and calcined basis expressed by an empirical formula $$(Si_xAl_yP_z)O_2$$

where x is the mole fraction of Si and has a value from 0.001 to 0.5, y is the mole fraction of Al and has a value of at least 0.01, z is the mole fraction of P has a value of at least 0.01, and x+y+z=1. In one embodiment, the process includes providing a reaction mixture comprising an aluminum source, a silicon source comprising a zeolite selected from the group consisting of UZM-9, UZM-5, UZM-12, or combinations thereof, a phosphorous source, and a dual organic template source comprising an organic amine template source and a quaternary ammonium organic template source; and crystallizing the molecular sieves at a temperature between 100° C. to 200° C., to provide the molecular sieve, and calcining the molecular sieve in air, where the molecular sieve is characterized as having a LTA framework with an average crystal size of less than 5 μm.

DETAILED DESCRIPTION OF THE INVENTION

A low silicon SAPO-42 molecular sieve has been developed. The low silicon SAPO-42 has less than about 5 wt % silicon, e.g., about 0.01 to about 5%. It has a cubic morphology with an average crystal size of less than about 5 μm and a LTA framework. The low silicon SAPO-42 is made using seeds of a zeolite selected from UZM-9, UZM-5, UZM-12, or combinations thereof. A dual organic template source of a quaternary ammonium organic template source and an organic amine template source is used to make the low silicon SAPO-42 molecular sieve. Crystallization of low silicon SAPO-42 is performed at a temperature in a range of about 125° C. to about 175° C., and a crystallization period of about 24 hr or less.

The UZM-9 zeolite has the same framework (LTA) as SAPO-42, UZM-5 has the framework of (UFI), and UZM-12 has the framework of (ERI), but they do not contain any phosphorus. Using the seeds of these zeolites as the silicon source allows much lower levels of silicon to be incorporated into the molecular sieve than in conventional SAPO-42.

The low silicon SAPO-42 is expected to have low acidity similar to AlPO-42, but unlike AlPO-2, it is stable to calcination. This low acidity allows the use of low silicon SAPO-42 molecular sieves in hydrocarbon separations.

One aspect of the invention is a porous crystalline silico-alumino-phosphate molecular sieve having a framework composition on an anhydrous and calcined basis expressed by an empirical formula $$(Si_xAl_yP_z)O_2$$

where x is the mole fraction of Si and has a value from 0.001 to about 0.15, y is the mole fraction of Al and has a value of at least 0.01, z is the mole fraction of P has a value of at least 0.01, and x+y+z=1, where the molecular sieve is characterized as having a LTA framework with an average crystal size of less than 5 μm.

In some embodiments, "x" has a value of 0.005 to about 0.15, or about 0.005 to about 0.01.

In some embodiments, the molecular sieve is characterized in that it has an x-ray diffraction pattern having at least the d-spacings and intensities given in Table A below:

TABLE A

| 2Θ | d(Å) | I/Io |
|---|---|---|
| 7.43-7.46 | 11.84-11.87 | s-vs |
| 10.51-10.52 | 8.38-8.4 | m |
| 12.88-12.9 | 6.85-6.86 | vs |
| 14.88-14.9 | 5.94-5.94 | m |
| 16.65-16.66 | 5.31-5.31 | w |
| 21.1-21.13 | 4.19-4.2 | m |
| 22.39-22.42 | 3.96-3.96 | vs |
| 23.61-23.63 | 3.75-3.76 | w |
| 24.79-24.82 | 3.58-3.58 | m |
| 26.99-27.02 | 3.29-3.29 | m |
| 28.03-28.05 | 3.17-3.17 | m |
| 30.96-30.97 | 2.88-2.88 | m |

TABLE A-continued

| 2Θ | d(Å) | I/Io |
|---|---|---|
| 31.87-31.89 | 2.8-2.8 | w |
| 35.35-35.36 | 2.53-2.53 | w-m |
| 45.7-45.73 | 1.98-1.98 | w |

Another aspect of the invention involves a process for the preparation of a low silicon SAPO-42 molecular sieve and a catalyst utilizing the molecular sieve. The process comprises providing a reaction mixture having an aluminum source, a phosphorus source, a silicon source comprising a zeolite selected from UZM-9, UZM-5, UZM-12, or combinations thereof, water, and a dual organic template source.

The silicon source is seeds of UZM-9, UZM-5, UZM-12 zeolites, and combinations thereof. The zeolite seeds can be combined with other silica sources, such as colloidal, fumed, or organic silica, if desired.

Preferred reactive sources of aluminum and phosphorus are pseudo-boehmite alumina, alumina alkoxides and phosphoric acid, but organic phosphates or crystalline or amorphous aluminophosphates have been found satisfactory.

The dual organic template source comprises quaternary ammonium organic template sources and organic amine template sources. The ratio of quaternary ammonium organic template sources to organic amine template sources is typically in the range of about 0.05 to about 0.2, or about 0.07 to about 0.17, or about 0.09 to about 0.15, or about 0.12 There can be one or more quaternary ammonium organic template source and one or more organic amine template sources.

Suitable quaternary ammonium organic template sources include, but are not limited to tetramethylammonium hydroxide, tetramethylammonium fluoride, tetramethylammonium bromide, tetramethylammonium chloride, tetramethylphosphonium hydroxide, tetramethylphosphonium fluoride, or combinations thereof.

Suitable organic amine template sources include, but are not limited to, diethanolamine, diisopropanolamine, or combinations thereof.

The dual organic template source (total amount of templating agent including both quaternary ammonium organic template sources and organic amine template sources) is supplied to the reaction mixture in a ratio from about 0.5 to about 3.0 times the amount of aluminum source on a molar basis, or about 1.0 to about 3.0, or about 1.5 to about 3.0, or about 1.7 to about 2.8, or about 1.7 to about 2.5 or about 1.9 to about 2.2. The dual organic template source and phosphorus source are supplied to the mixture at a ratio from about 1.4 to about 2.5 on a molar basis, or about 1.7 to about 2.5, or about 1.9 to about 2.2.

The reaction mixture, including a source of aluminum, a source of phosphorous, a source of silicon, and the dual organic template source is placed in a sealed pressure vessel which is lined with an inert plastic material such as polytetrafluoroethylene, and heated preferably under autogenous pressure at a temperature between about 100° C. and about 200° C., or about 125° C. to about 175° C. for a time sufficient to produce crystals. Typically, the time is about 24 hr or less, or about 1 to less than about 24 hours, or about 1 to about 20 hours, or about 1 to about 5 hr. The desired product is recovered by any convenient separation method, including, but not limited to, centrifugation, filtration, or decanting.

The molecular sieves of the present invention may be combined with one or more formulating agents, to form a molecular sieve catalyst or absorbent composition or a formulated molecular sieve catalyst composition. The formulating agents may be one or more of binding agents, matrix or filler materials, catalytically active materials, and mixtures thereof. This formulated molecular sieve catalyst composition is formed into desired shapes and sized particles by well-known techniques such as spray drying, pelletizing, extrusion, and the like.

Matrix materials are typically effective in: reducing overall catalyst cost; acting as thermal sinks assisting in shielding heat from the catalyst composition, for example during regeneration; densifying the catalyst composition; increasing catalyst strength, such as crush strength and attrition resistance; and controlling the rate of conversion in a particular process. Matrix materials include synthetic and naturally occurring materials such as clays, silica, and metal oxides. Clays include, but are not limited to, kaolin, kaolinite, montmorillonite, saponite, and bentonite.

Binders include any inorganic oxide well known in the art, and examples include, but are not limited to, alumina, silica, aluminum-phosphate, silica-alumina, and mixtures thereof. When a binder is used, the amount of molecular sieve present is in an amount from about 10 to 90 weight percent of the catalyst. Preferably, the amount of molecular sieve present is in an amount from about 30 to 70 weight percent of the catalyst.

The molecular sieve and the formulating agents are combined in a liquid to form a slurry and mixed to produce a substantially homogeneous mixture containing the molecular sieve. Examples of suitable liquids include water, alcohol, ketones, aldehydes, esters, and combinations thereof. The liquid is typically water.

The molecular sieve and the formulating agents may be in the same or different liquid, and may be combined in any order, together, simultaneously, sequentially, or a combination thereof. In some embodiments, the same liquid is used. The molecular sieve and formulating agents are combined in a liquid as solids, substantially dry or in a dried form, or as slurries, together or separately. If solids are added together as dry or substantially dried solids, a limited and/or controlled amount of liquid can be added.

In some embodiments, the slurry of the molecular sieve and formulating agents is mixed or milled to achieve a sufficiently uniform slurry of smaller particles that is then fed to a forming unit to produce the molecular sieve catalyst composition. A spray dryer is often used as the forming unit. Typically, the forming unit is maintained at a temperature sufficient to remove most of the liquid from the slurry and from the resulting molecular sieve catalyst composition. The resulting catalyst composition when formed in this way takes the form of microspheres.

Generally, the particle size of the powder is controlled to some extent by the solids content of the slurry. However, the particle size of the catalyst composition and its spherical characteristics are also controllable by varying the slurry feed properties and conditions of atomization. Also, although spray dryers produce a broad distribution of particle sizes, classifiers are normally used to separate the fines which can then be milled to a fine powder and recycled to the spray dryer feed mixture.

After the molecular sieve catalyst composition is formed in a substantially dry or dried state, a heat treatment, such as calcination, at an elevated temperature is usually performed to further harden and/or activate the formed catalyst composition. A conventional calcination environment is air that typically includes a small amount of water vapor. Typical calcination temperatures are in the range from about 400° C. to about 1000° C., or about 500° C. to about 800° C., or about 550° C. to about 700° C. The calcination environment is a gas such as air, nitrogen, helium, flue gas (combustion product lean in oxygen), or any combination thereof. Heating is carried out for a period of time typically from about 30 minutes to about 15 hours, or about 1 hour to about 10 hours, or about 1 hour to about 5 hours, or about 2 hours to about 4 hours.

In some embodiments, calcination of the formulated molecular sieve catalyst composition is carried out in any number of well known devices including rotary calciners, fluid bed calciners, batch ovens, and the like. Calcination time is typically dependent on the desired degree of hardening of the molecular sieve catalyst composition and the temperature.

In one embodiment, the molecular sieve catalyst composition is heated in air at a temperature of from about 550° C. to about 650° C. for about 2 to about 4 hr.

In addition to the molecular sieve of the present invention, the catalyst compositions of the present invention may comprise one or several other catalytically active materials.

The structure of the low silicon SAPO-42 molecular sieve was determined by x-ray analysis. The x-ray patterns presented in the following examples were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined by the integrated area of the diffraction peaks after subtracting background, "$I_0$" being the intensity of the strongest line or peak, and "I" being the intensity of each of the other peaks.

As will be understood by those of skill in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of $100 \times I/I_0$, the above designations are defined as:

$w = 0-15$ $m = 15-60$ $s = 60-80$ $vs = 80-100$

In order to more fully illustrate the invention, the following examples are set forth. It is to be understood that the examples are only by way of illustration and are not intended as an undue limitation on the broad scope of the invention as set forth in the appended claims.

EXAMPLE 1

In a container, 16.18 g of orthophosphoric acid (85%) was combined with 20 g of water. To this mixture 6.53 g of tetramethylammonium fluoride (TMAF) (20%) (SACHEM) was added, followed by 8.10 g of alumina (Versal 251 available from UOP). Finally, 12.53 g of diethanolamine, 1 g of UZM-9 (LTA zeolite with Si/Al=5), and 16.66 g of water were added. The resulting gel was mixed for 30 minutes.

The gel was transferred to 3 parr reactors. The autoclaves were kept at 175° C. in a tumble oven for 5 hrs. The product was recovered by centrifugation and washed with water three times. The product was dried in a 125° C. oven, and calcined at 600° C. for 6 hrs, The product was identified as SAPO-42 by XRD. Representative diffraction lines observed for the product are shown in Table 1. Elemental analysis of the dried powder showed 22.7% Al, 21.5% P and 3.39% Si. This corresponds to $Al_{0.507}P_{0.419}Si_{0.073}O_2$, expressed as normalized mole fraction. SEM of the low Si SAPO-42 showed a material with cubic morphology. The SAPO-42 had a BET surface area of 544 m²/g, and a micropore volume of 0.27 cc/g.

TABLE 1

| 2Θ | d(Å) | I/I$_o$% |
|---|---|---|
| 7.46 | 11.84 | vs |
| 10.52 | 8.40 | m |
| 12.9 | 6.85 | vs |
| 14.90 | 5.94 | m |
| 16.66 | 5.31 | w |
| 21.13 | 4.19 | m |
| 22.16 | 4.08 | m |
| 22.42 | 3.96 | vs |
| 23.63 | 3.76 | w |
| 24.56 | 3.62 | w |
| 24.82 | 3.58 | m |
| 27.02 | 3.29 | m |
| 28.05 | 3.17 | m |
| 30.97 | 2.88 | m |
| 31.89 | 2.80 | w |
| 35.36 | 2.53 | w |
| 45.73 | 1.98 | w |

EXAMPLE 2

In a container, 18.94 g of orthophosphoric acid (85%) was combined with 20 g of water. To this mixture, 6.37 g of TMAF (20%) (Sachem Chemical) was added, followed by 7.90 g of alumina (Versal 251). Finally, 12.23 g of diethanolamine, 0.5 g of UZM-9 (LTA zeolite with Si/Al=5), and 14.55 g of water were added. The resulting gel was mixed for 30 minutes.

The gel was transferred to 3 parr reactors. The autoclaves were kept at 175° C. in a tumble oven for 5 hrs. The product was recovered by centrifugation and washed with water three times. The product was dried in a 125° C. oven and was calcined at 600° C. for 6 hrs.

The product was identified as SAPO-42 by XRD. Elemental analysis of the dried powder showed 21.5% Al, 24.4% P and 1.28% Si. This corresponds to $Al_{0.489}P_{0.419}Si_{0.028}O_2$, expressed as normalized mole fraction. SEM of the low silicon SAPO-42 showed a material with cubic morphology. The SAPO-42 had a BET surface area of 597 m²/g, and a micropore volume of 0.30 cc/g.

EXAMPLE 3

In a container, 16.18 g of orthophosphoric acid (85%) was combined with 20 g of water. To this mixture, 6.53 g of TMAF (20%) (Sachem Chemical) was added, followed by 8.1 g of alumina (Versal 251). Finally, 12.53 g of diethanolamine, 0.5 g of UZM-9 (LTA zeolite with Si/Al=5) and 16.66 g of water were added. The resulting gel was mixed for 30 minutes.

The gel was transferred to 3 parr reactors. The autoclaves were kept at 175° C. in a tumble oven for 5 hrs. The product was recovered by centrifugation and washed with water three times. The product was dried in a 125° C. oven.

The product was identified as SAPO-42 by XRD. Elemental analysis of the dried powder showed 23.6% Al, 21.8% P and 2.23% Si. This corresponds to $Al_{0.528}P_{0.424}Si_{0.048}O_2$, expressed as normalized mole fraction. SEM of the low silicon SAPO-42 showed a material with cubic morphology.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A porous crystalline silico-alumino-phosphate molecular sieve having a framework composition on an anhydrous and calcined basis expressed by an empirical formula $$(Si_xAl_yP_z)O_2$$

where x is the mole fraction of Si and has a value from 0.001 to about 0.15, y is the mole fraction of Al and has a value of at least 0.01, z is the mole fraction of P has a value of at least 0.01, and x+y+z=1, where the molecular sieve is characterized as having a LTA framework with an average crystal size of less than 5 μm.

2. The molecular sieve of claim 1 characterized in that it has the x-ray diffraction pattern having at least the d-spacings and intensities given in Table A below:

TABLE A

| 2Θ | d(Å) | I/Io |
|---|---|---|
| 7.43-7.46 | 11.84-11.87 | s-vs |
| 10.51-10.52 | 8.38-8.4 | m |
| 12.88-12.9 | 6.85-6.86 | vs |
| 14.88-14.9 | 5.94-5.94 | m |
| 16.65-16.66 | 5.31-5.31 | w |
| 21.1-21.13 | 4.19-4.2 | m |
| 22.39-22.42 | 3.96-3.96 | vs |
| 23.61-23.63 | 3.75-3.76 | w |
| 24.79-24.82 | 3.58-3.58 | m |
| 26.99-27.02 | 3.29-3.29 | m |
| 28.03-28.05 | 3.17-3.17 | m |
| 30.96-30.97 | 2.88-2.88 | m |
| 31.87-31.89 | 2.8-2.8 | w |
| 35.35-35.36 | 2.53-2.53 | w-m |
| 45.7-45.73 | 1.98-1.98 | w. |

3. The molecular sieve of claim 1 where x has a value from about 0.005 to about 0.01.

4. A process for the preparation of a porous crystalline silico-alumino-phosphate molecular sieve having a framework composition on an anhydrous and calcined basis expressed by an empirical formula $$(Si_xAl_yP_z)O_2$$

where x is the mole fraction of Si and has a value from 0.001 to 0.5, y is the mole fraction of Al and has a value of at least 0.01, z is the mole fraction of P has a value of at least 0.01, and x+y+z=1, the process comprising:

providing a reaction mixture comprising an aluminum source, a silicon source comprising a zeolite selected from the group consisting of UZM-9, UZM-5, UZM-12, or combinations thereof, a phosphorous source, and a dual organic template source comprising an organic amine template source and a quaternary ammonium organic template source; and crystallizing the molecular sieves at a temperature between about 100° C. to about 200° C., to provide the molecular sieve, and calcining the molecular sieve in air, where the molecular sieve is characterized as having a LTA framework with an average crystal size of less than 5 μm.

5. The process of claim 4 characterized in that it has the x-ray diffraction pattern having at least the d-spacings and intensities given in Table A below

TABLE A

| 2Θ | d(Å) | I/Io |
|---|---|---|
| 7.43-7.46 | 11.84-11.87 | s-vs |
| 10.51-10.52 | 8.38-8.4 | m |
| 12.88-12.9 | 6.85-6.86 | vs |
| 14.88-14.9 | 5.94-5.94 | m |
| 16.65-16.66 | 5.31-5.31 | w |
| 21.1-21.13 | 4.19-4.2 | m |
| 22.39-22.42 | 3.96-3.96 | vs |
| 23.61-23.63 | 3.75-3.76 | w |
| 24.79-24.82 | 3.58-3.58 | m |
| 26.99-27.02 | 3.29-3.29 | m |
| 28.03-28.05 | 3.17-3.17 | m |
| 30.96-30.97 | 2.88-2.88 | m |
| 31.87-31.89 | 2.8-2.8 | w |
| 35.35-35.36 | 2.53-2.53 | w-m |
| 45.7-45.73 | 1.98-1.98 | w. |

6. The process of claim 4 where x has a value from about 0.005 to about 0.15.

7. The process of claim 4 where x has a value from about 0.005 to about 0.01.

8. The process of claim 4 wherein the dual organic template source is present in the reaction mixture in an amount on a molar basis from about 0.5 to about 3.0 times an amount of the aluminum source.

9. The process of claim 4 wherein the dual organic template source is present in the reaction mixture in an amount on a molar basis from about 1.4 to about 2.5 times an amount of the phosphorous source.

10. The process of claim 4 wherein the quaternary ammonium organic template source is selected from the group consisting of tetramethylammonium hydroxide, tetramethylammonium fluoride, tetramethylammonium bromide, tetramethylammonium chloride, tetramethylphosphonium hydroxide, tetramethylphosphonium fluoride, or combinations thereof.

11. The process of claim 10 wherein the quaternary ammonium organic template source is tetramethylammonium fluoride.

12. The process of claim 4 wherein the organic amine template source is selected from the group consisting of diethanolamine, diisopropanolamine, or combinations thereof.

13. The process of claim 12 wherein the organic amine template source is diethanolamine.

14. The process of claim 4 wherein the silicon source comprises UZM-9.

15. The process of claim 4 wherein the reaction mixture is heated at a temperature in the range of about 125° C. to about 175° C. for a period of about 24 hr or less.

16. The process of claim 4 wherein the molecular sieve is calcined at a temperature in a range of about 550 to about 650° C.

17. The process of claim 4 the molecular sieve is stable to hydration after calcination.

18. The process of claim 4 wherein the average crystal size is less than about 2 μm.

19. The process of claim 4 wherein a ratio of the quaternary ammonium organic template source to the organic amine template source is in a range of about 0.05 to about 0.2.

20. A process for the preparation of a porous crystalline silico-alumino-phosphate molecular sieve having a framework composition on an anhydrous and calcined basis expressed by an empirical formula $$(Si_xAl_yP_z)O_2$$

where x is the mole fraction of Si and has a value from 0.001 to 0.5, y is the mole fraction of Al and has a value of at least 0.01, z is the mole fraction of P has a value of at least 0.01, and x+y+z=1, the process comprising:

providing a reaction mixture comprising an aluminum source, a silicon source comprising a zeolite selected from the group consisting of UZM-9, UZM-5, UZM-12, or combinations thereof, a phosphorous source, and a dual organic template source comprising an organic amine template source and a quaternary ammonium organic template source; and crystallizing the molecular sieves at a temperature between about 100° C. to about 200° C., to provide the molecular sieve, and calcining the molecular sieve in air, where the molecular sieve is characterized as having a LTA framework with an average crystal size of less than 5 μm;

wherein the quaternary ammonium organic template source is selected from the group consisting of tetramethylammonium hydroxide, tetramethylammonium fluoride, tetramethylammonium bromide, tetramethylammonium chloride, tetramethylphosphonium hydroxide, tetramethylphosphonium fluoride, or combinations thereof;

wherein the organic amine template source is selected from the group consisting of diethanolamine, diisopropanolamine, or combinations thereof;

wherein the dual organic template source is present in the reaction mixture in an amount on a molar basis from about 0.5 to about 2.5 times an amount of the aluminum source;

wherein the dual organic template source is present in the reaction mixture in an amount on a molar basis from about 1.4 to about 2.0 times an amount of the phosphorous source; and wherein a ratio of the quaternary ammonium organic template source to the organic amine template source is in a range of about 0.05 to about 0.2.

* * * * *